US012596418B2

(12) United States Patent
Zhang et al.

(10) Patent No.: US 12,596,418 B2
(45) Date of Patent: Apr. 7, 2026

(54) POWER SUPPLY SYSTEM AND POWER SUPPLY METHOD

(71) Applicant: Delta Electronics (Shanghai) Co.,Ltd., Shanghai (CN)

(72) Inventors: Weiqiang Zhang, Shanghai (CN); Sanyuan Ouyang, Shanghai (CN); Hong Liu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 215 days.

(21) Appl. No.: 18/633,533

(22) Filed: Apr. 12, 2024

(65) Prior Publication Data

US 2024/0393852 A1    Nov. 28, 2024

(30) Foreign Application Priority Data

May 26, 2023    (CN) .......................... 202310611004.2

(51) Int. Cl.
*G06F 1/26* (2006.01)

(52) U.S. Cl.
CPC .............. *G06F 1/263* (2013.01); *G06F 1/266* (2013.01)

(58) Field of Classification Search
None
See application file for complete search history.

(56) References Cited

U.S. PATENT DOCUMENTS

| | | | |
|---|---|---|---|
| 11,048,311 | B1 | 6/2021 | Churnock et al. |
| 2018/0032119 | A1 | 2/2018 | McGraw et al. |
| 2023/0054222 | A1 | 2/2023 | Stokman et al. |

FOREIGN PATENT DOCUMENTS

| | | |
|---|---|---|
| CN | 111416337 A | 7/2020 |
| CN | 212210598 U | 12/2020 |
| CN | 112542830 A | 3/2021 |
| CN | 108923409 B | 7/2021 |
| CN | 114374257 A | 4/2022 |
| CN | 114552763 A | 5/2022 |
| WO | 2021169430 A1 | 9/2021 |

*Primary Examiner* — Paul Yen
(74) *Attorney, Agent, or Firm* — CKC & Partners Co., LLC

(57) ABSTRACT

The disclosure provides a power system comprising: a first converter comprising a first port electrically connected to the first port of a first power device, a second port electrically connected to the third port, and a third port electrically connected to the fourth port; a second converter comprising a first port electrically connected to the second port of the first power device, a second port electrically connected to the third port, and a third port electrically connected to the fourth port; a third converter comprising a first port electrically connected to the first port of a second power device, a second port electrically connected to the third port, and a third port electrically connected to the fourth port; a fourth converter comprising a first port electrically connected to the second port, a second port electrically connected to the third port, and a third port electrically connected to the fourth port.

18 Claims, 12 Drawing Sheets

POWER SUPPLY SYSTEM AND POWER SUPPLY METHOD

CROSS-REFERENCE TO RELATED APPLICATIONS

This non-provisional application claims priority under 35 U.S.C. § 119 (a) on Patent Applications No. 202310611004.2 filed on May 26, 2023, in P.R. China, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The disclosure relates to power electronics technology, and particularly to a power supply system and a power supply method.

BACKGROUND

Recently, a market size of data center keeps a rapid growth. The power supply system, which serves as critical infrastructure of the data center, also faces a greater challenge, and has some common indexes in the industry, including: power utilization efficiency (PUE), which requires a wide load range, thereby improving efficiency and reducing the PUE; infrastructure utilization efficiency (IUE), which requires enhancing the IUE, thereby reducing investment; availability utilization efficiency (AUE), which requires enhancing the AUE of a power supply link without downtime; and space utilization efficiency (SUE), which requires reducing an occupied area of the infrastructure, thereby improving the utilization efficiency.

Currently, the data center has the issue that the utilization efficiency of the existing power supply facility for most client types is only about 20% with low utilization efficiency and idle assets. Moreover, at a low load rate, a conversion efficiency of the power supply facility is also low, the battery for backup has a high cost, but a very low utilization efficiency, and the backup battery is used only once or twice each year on average. Meanwhile, power supply failure is still the main reason for downtime of the data center, and has a growing tendency.

In the prior art, a plurality of power supply lines are often connected using the way of a looped network or hand-in-hand interconnection, after interconnection, the AUE of the system may be enhanced, and efficiency and IUE of the system may be improved by scheduling. However, this method also has certain disadvantages. For example, when a plurality of power supply lines are connected, connection units such as circuit breakers and DC converters are often used, which increases complexity of the system, and improves cost of the data center.

SUMMARY

An object of the disclosure is to provide a power supply system and a power supply method, and the system is simple in structure without using connection units, and has advantages of high efficiency, high utilization efficiency, reduction of battery configuration, and a high AUE.

In order to achieve the object, on one hand, the disclosure provides a power supply system, including:

a first power supply device including a first port, a second port, a third port and a fourth port, the first port of the first power supply device and the second port of the first power supply device electrically coupled to different power supply buses; the first power supply device further including:

a first converter including a first port electrically connected to the first port of the first power supply device, a second port electrically connected to the third port of the first power supply device, and a third port electrically connected to the fourth port of the first power supply device; and a second converter including a first port electrically connected to the second port of the first power supply device, a second port electrically connected to the third port of the first power supply device, and a third port electrically connected to the fourth port of the first power supply device;

a second power supply device including a first port, a second port, a third port and a fourth port, the first port of the second power supply device and the second port of the second power supply device electrically coupled to different power supply buses; the second power supply device further including:

a third converter including a first port electrically connected to the first port of the second power supply device, a second port electrically connected to the third port of the second power supply device, and a third port electrically connected to the fourth port of the second power supply device; and a fourth converter including a first port electrically connected to the second port of the second power supply device, a second port electrically connected to the third port of the second power supply device, and a third port electrically connected to the fourth port of the second power supply device; and a first load including a first receiving port electrically coupled to the fourth port of the first power supply device, and a second receiving port electrically coupled to the third port of the second power supply device.

Alternatively, the first power supply device further including a fifth port and a fifth converter; the first port of the first power supply device, the second port of the first power supply device and the fifth port of the first power supply device are electrically coupled to different power supply buses;

the fifth converter including a first port electrically connected to the fifth port of the first power supply device, a second port electrically connected to the third port of the first power supply device, and a third port electrically connected to the fourth port of the first power supply device.

Alternatively, the second power supply device further including a fifth port and a sixth converter; the first port of the second power supply device, the second port of the second power supply device and the fifth port of the second power supply device are electrically coupled to different power supply buses;

the sixth converter including a first port electrically connected to the fifth port of the second power supply device, a second port electrically connected to the third port of the second power supply device, and a third port electrically connected to the fourth port of the second power supply device.

Alternatively, the power supply system further including:

a second load including a third receiving port electrically coupled to the third port of the first power supply device, and a fourth receiving port electrically coupled to the fourth port of the second power supply device.

Alternatively, the power supply system further includes:

a third power supply device including a first port, a second port, a third port and a fourth port, the first port of the third power supply device and the second port of the third power supply device are electrically coupled to different power supply buses; the third power supply device further including:

a seventh converter including a first port electrically connected to the first port of the third power supply device, a second port electrically connected to the third port of the third power supply device, and a third port electrically connected to the fourth port of the third power supply device; and an eighth converter including a first port electrically connected to the second port of the third power supply device, a second port electrically connected to the third port of the third power supply device, and a third port electrically connected to the fourth port of the third power supply device.

Alternatively, the power supply system further including:

a second load including a third receiving port electrically coupled to the third port of the first power supply device or the fourth port of the second power supply device, and a fourth receiving port electrically coupled to the third port of the third power supply device.

Alternatively, the power supply system further including:

a third load including a fifth receiving port electrically coupled to the third port of the first power supply device or the fourth port of the second power supply device, and a sixth receiving port electrically coupled to the fourth port of the third power supply device.

Alternatively, the power supply system further including a first energy storage device electrically coupled to the fourth port of the first power supply device or the third port of the second power supply device.

Alternatively, the power supply system including a first energy storage device electrically coupled to the fourth port of the first power supply device, and a second energy storage device electrically coupled to the third port of the second power supply device.

Alternatively, the power supply system further including a third energy storage device electrically coupled to the third port of the first power supply device, and a fourth energy storage device electrically coupled to the fourth port of the second power supply device.

Alternatively, all converters including a rectifier circuit, a first isolated transformer circuit and a second isolated transformer circuit; a first side of the rectifier circuit corresponds to the first port of the converter, a first side of the first isolated transformer circuit and a first side of the second isolated transformer circuit are connected in parallel to a second side of the rectifier circuit, a second side of the first isolated transformer circuit corresponds to the second port of the converter, and a second side of the second isolated transformer circuit corresponds to the third port of the converter.

Alternatively, all isolated transformer circuits are bidirectional DC/DC conversion circuits.

On the other hand, the disclosure provides a power supply method using the power supply system, when the third port of the second converter cannot output current, an output power of the first converter is adjusted to maintain an output power at the fourth port of the first power supply device to be constant.

Alternatively, when the third port and the fourth port of the first power supply device cannot output current, an output power of the second power supply device is adjusted to maintain powering of the first load.

Alternatively, the power supply system further including a first energy storage device electrically coupled to the fourth port of the first power supply device or the third port of the second power supply device;

when the fourth port of the first power supply device and the third port of the second power supply device cannot output current, the first energy storage device powers the first load.

Alternatively, the power supply system further including a first energy storage device electrically coupled to the fourth port of the first power supply device, and a second energy storage device electrically coupled to the third port of the second power supply device;

when the fourth port of the first power supply device and the third port of the second power supply device cannot output current, the first energy storage device and the second energy storage device power the first load simultaneously.

Alternatively, the power supply system further including a third energy storage device electrically coupled to the third port of the first power supply device;

when the second energy storage device cannot power the first load, energy of the third energy storage device is inputted to the first power supply device along the third port of the first power supply device, and outputted to the first load along the fourth port of the first power supply device.

On the other hand, the disclosure further provides a power supply method using the power supply system, the power supply system further including a first energy storage device electrically coupled to the fourth port of the first power supply device or the third port of the second power supply device;

the energy of the first energy storage device is inputted to the first power supply device along the fourth port of the first power supply device, and outputted along the first port or the second port of the first power supply device.

As can be known from the above scheme, advantages of the disclosure lie in:

the power supply system provided by the disclosure powers directly using the first power supply device and the second power supply device, the first power supply device and the second power supply device at least include two converters, the first load can be powered simultaneously through any converter of the first power supply device and any converter of the second power supply device without using connection units, so the structure is simple, and is also applicable even if the battery is directly connected. Moreover, load rates are matched through multiple converters, and the inputted converters are scheduled to maintain that each converter is always operated at a high efficiency point, thereby ensuring that the power supply system is efficient and power saving in a full load range, such that efficiency of the system is improved.

DETAILED DESCRIPTION

To make the features and effects of the disclosure to be more apparent, hereinafter detailed explanations are made with reference to the embodiments and the accompanying drawings.

Embodiment One

Figure 1:
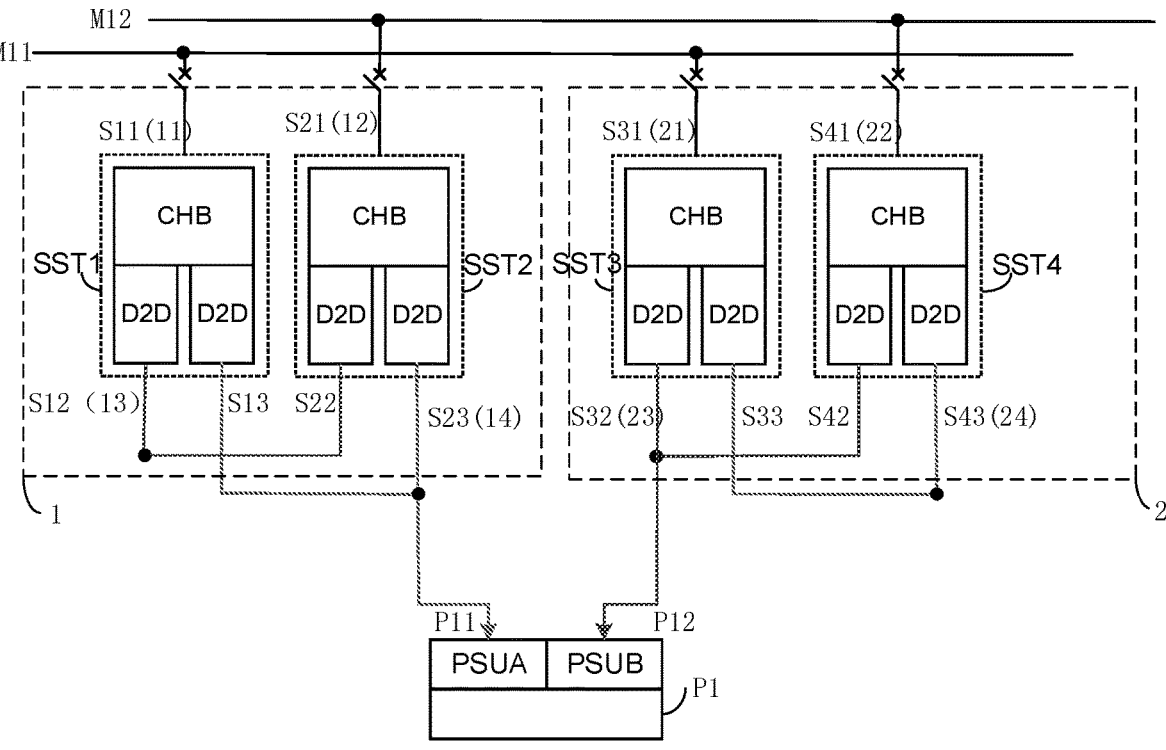
FIG. 1 is a topological schematic diagram of a power supply system.

FIG. 1 shows a topological schematic diagram of a power supply system provided in embodiment one. The power supply system is formed by two groups of power supply devices such as a first power supply device and a second power supply device, and loads are coupled between the two groups of power supply devices. Each group of power supply devices includes two converters, each converter in the same group of power supply devices has an input end and two DC output ends. Specific structure of the power supply system is as follows:

A power supply system, including a first power supply device 1, a second power supply device 2, and a first load P1 coupled between the first power supply device 1 and the second power supply device 2.

As for the first power supply device 1, it specifically includes a first converter SST1, a second converter SST2, and a first port 11, a second port 12, a third port 13 and a fourth port 14.

The first port 11 and the second port 12 of the first power supply device 1 are electrically coupled to different power supply buses, respectively. For example, the first port 11 of the first power supply device 1 is electrically coupled to a first power supply bus M11, and the second port 12 of the first power supply device 1 is electrically coupled to a second power supply bus M12.

Specifically, the first converter SST1 includes a first port S11 electrically connected to the first port 11 of the first power supply device 1, a second port S12 electrically connected to the third port 13 of the first power supply device 1, and a third port S13 electrically connected to the fourth port 14 of the first power supply device 1.

Specifically, the second converter SST2 includes a first port S21 electrically connected to the second port 12 of the first power supply device, a second port S22 electrically connected to the third port 13 of the first power supply device, and a third port S23 electrically connected to the fourth port 14 of the first power supply device.

In this embodiment, the first ports of different converters in the first power supply device are actually electrically coupled to different power supply buses. In other embodiments, the first ports of different converters in the same power supply device shall be actually electrically coupled to different power supply buses, to ensure high AUE of the power supply system.

As for the second power supply device 2, it specifically includes a third converter SST3, a fourth converter SST4, and a first port 21, a second port 22, a third port 23 and a fourth port 24.

The first port 21 and the second port 22 of the second power supply device 2 are electrically coupled to different power supply buses, respectively. For example, the first port 21 of the second power supply device is electrically coupled to the first power supply bus M11, and the second port 22 of the second power supply device is electrically coupled to the second power supply bus M12.

It should be noted that although the power buses connected to different power devices in this embodiment and other embodiments are completely same, for example, the first power supply device 1 and the second power supply device 2 are both connected to the first power supply bus M11 and the second power supply bus M12, in actual situations, the power supply buses connected to different power supply devices can also be partially the same or completely different, only if the first ports of different converters of the same power supply device are actually electrically coupled to different power supply buses. The disclosure does not limit the relation between the power supply buses connected to different power supply devices.

Specifically, the third converter SST3 includes a first port S31 electrically connected to the first port 21 of the second power supply device, a second port S32 electrically connected to the third port 23 of the second power supply device, and a third port S33 electrically connected to the fourth port 24 of the second power supply device.

Specifically, the fourth converter SST4 includes a first port S41 electrically connected to the second port 21 of the second power supply device, a second port S42 electrically connected to the third port 23 of the second power supply device, and a third port S43 electrically connected to the fourth port 24 of the second power supply device.

Please refer to FIG. 1, the first load P1 includes a first receiving port P11 electrically coupled to the fourth port 14 of the first power supply device 1, and a second receiving port P12 electrically coupled to the third port 23 of the second power supply device 2, the first receiving port P11 can receive power outputted from the fourth port 14 of the first power supply device 1, and the second receiving port P12 can receive power outputted from the third port 23 of the second power supply device 2. In order to satisfy operation requirement of the first load P1, the first receiving port P11 and the second receiving port P12 can receive power input simultaneously, and it is also possible that only one of them receives power input. Under normal working conditions, assuming that power input desired by the first load P1 is 100%, 50% power input can be received through the first receiving port P11, and 50% power input can be received through the second receiving port P12.

In this embodiment, the first power supply device 1 and the second power supply device 2 include two converters, respectively. The first load P1 can be powered simultaneously through any converter of the first power supply device 1 and any converter of the second power supply device 2, thereby achieving receiving power from both sides. In practice, each converter can be intelligently controlled by combining the efficiency curve of the converter with the power demand of the load, so that the converter always runs at a high efficiency, so as to ensure that the power supply system can operate more efficiently in the full load range.

Figure 3A:
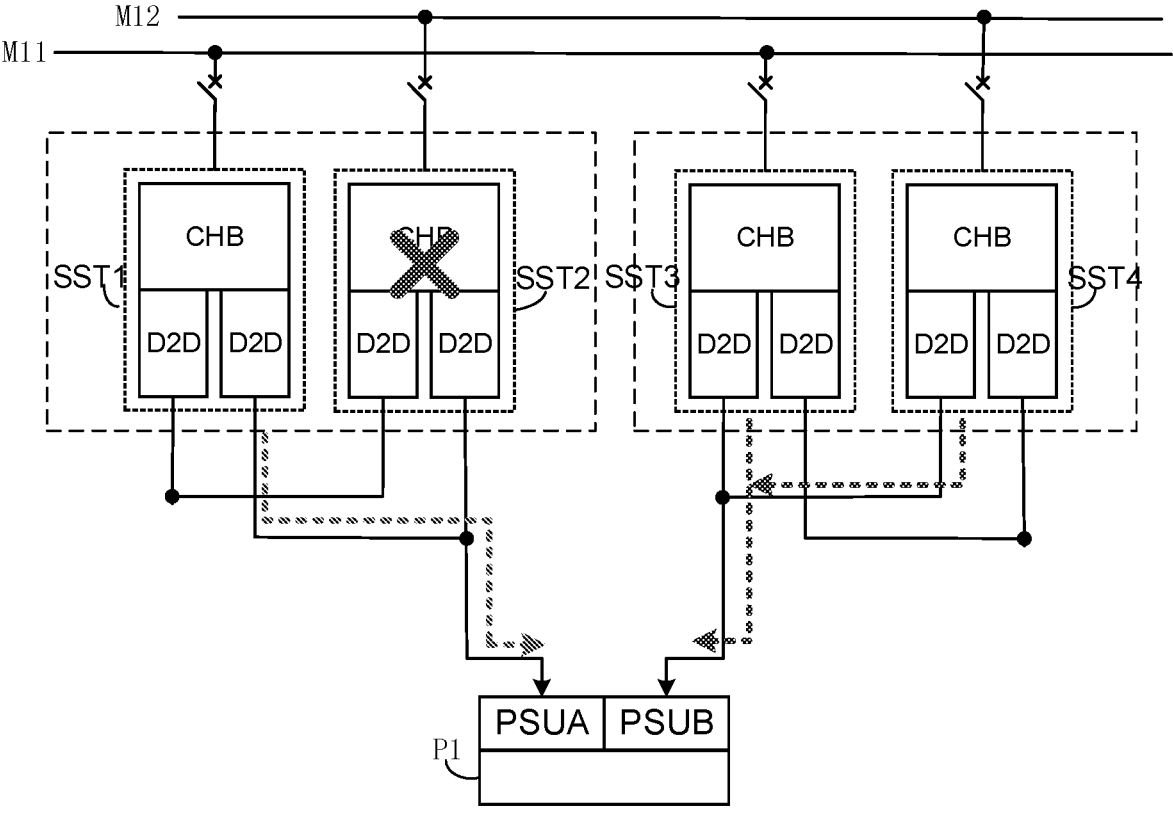
FIG. 3a is a diagram of working principle of the power supply system (working condition 1: one single converter has fault).

The power supply system disclosed in this embodiment also has a high AUE, when any converter in the first power supply device or the second power supply device cannot output current, an output power of the first power supply device or the second power supply device can still be maintained. Referring to FIG. 3*a*, when the third port S23 of the second converter SST2 in the first power supply device 1 cannot output current, such as the second converter SST2 has fault or the second power supply bus M12 electrically coupled to the second port 12 of the first power supply device 1 is disconnected, the output power at the fourth port 14 of the first power supply device 1 can be maintained to be constant by adjusting an output power of the first converter SST1, thereby ensuring that the first receiving port P11 of the first load P1 can still receive 50% power input, so that the first load P1 can still receive stable power from both sides.

Figure 3B:
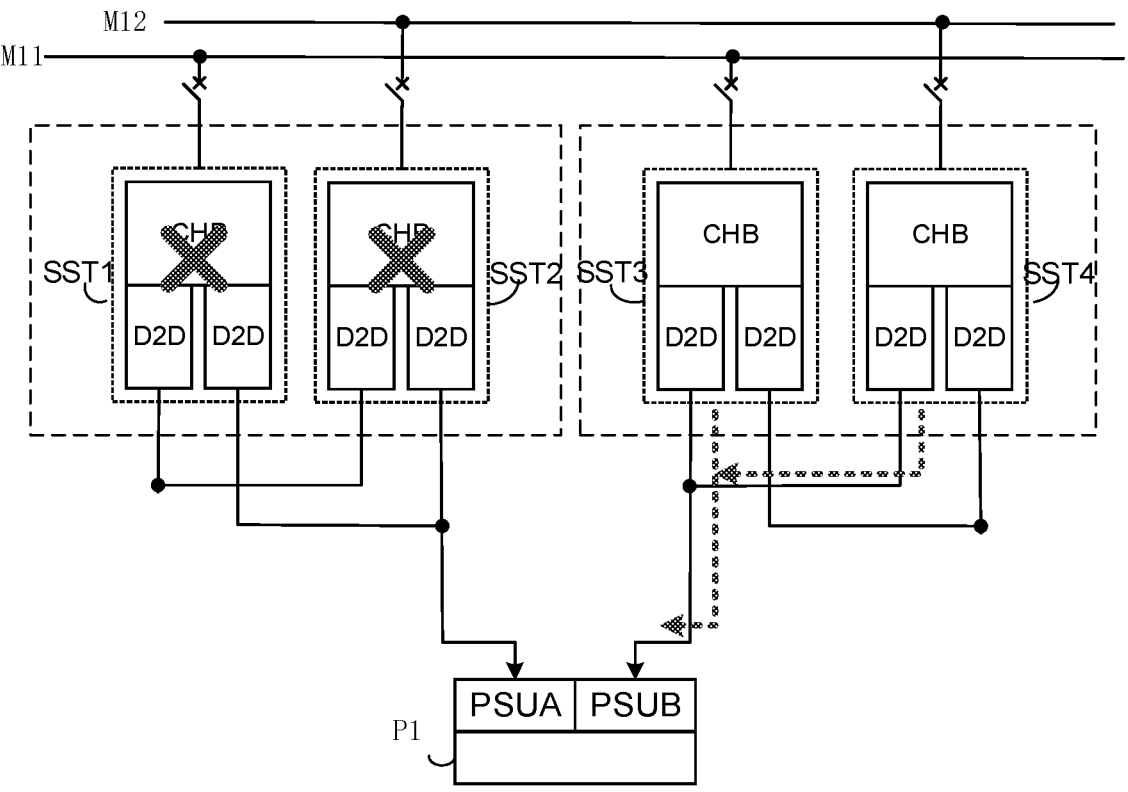
FIG. 3b is a diagram of working principle of the power supply system (working condition 2: the adjacent two converters of the same power supply device have fault).

In more extreme cases, when the first power supply device 1 or the second power supply device 2 cannot normally output current, the first load P1 can still be ensured to receive sufficient power input for normal operation. Referring to FIG. 3*b*, for example, when the first converter SST1 and the second converter SST2 of the first power supply device 1 both have fault, and the third port 13 and the fourth port 14 of the first power supply device 1 do not have normal current output, the first load P1 can still receive power from the second power supply device 2 through the second receiving port P12, and the second receiving port P12 is ensured to receive 100% power input for normal operation of the first load P1 by adjusting the output power of the second power supply device 2. Therefore, when any converter or any power supply device has fault, the power supply system provided in this embodiment can maintain normal operation of the loads, and provide sufficient time for quick maintenance at the fault, thereby enhancing the AUE without downtime.

Therefore, in the power supply system provided in this embodiment, the loads can receive power between the first power supply device and the second power supply device through bridging of the loads, such that the first power supply device and the second power supply device can be backup for each other without using connection units. The structure is simple, and is also applicable when the battery is directly connected.

Embodiment Two

Figure 4:
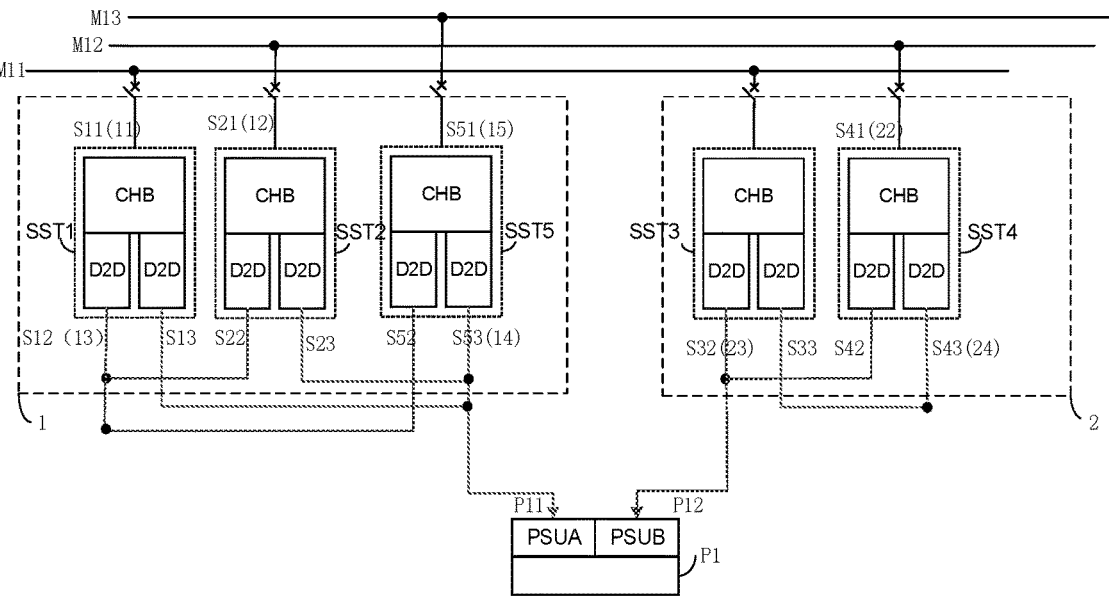
FIG. 4 is a topological schematic diagram of a power supply system.

In some embodiments, the number of converters of the first power supply device or the second power supply device can be further expanded, and if the number of converters is increased, utilization efficiency of the power supply facility is reduced to further enhance the AUE of the system. Referring to FIG. 4, on the basis of embodiment one, the first power supply device 1 of this embodiment further comprises a fifth port 15 and a fifth converter SST5.

A power supply bus electrically coupled to the fifth port 15 of the first power supply device 1 shall be different from the power supply buses electrically coupled to the first port 11 and the second port 12. For example, the fifth port 15 of the first power supply device 1 is electrically coupled to a third power supply bus M13, such that the first port 11, the second port 12 and the fifth port 15 of the first power supply device 1 are electrically coupled to three different power supply buses, respectively.

Specifically, the fifth converter SST5 includes a first port S51 electrically connected to the fifth port 15 of the first power supply device 1, a second port S52 electrically connected to the third port 13 of the first power supply device 1, and a third port S53 electrically connected to the fourth port 14 of the first power supply device 1.

As compared to the embodiment one, in this embodiment, the connection ways of the first converter SST1 and the second converter SST2 in the first power supply device 1 and the third converter SST3 and the fourth converter SST4 in the second power supply device 2 are unchanged, and the difference from embodiment one is that the first power supply device 1 in this embodiment newly adds the fifth converter SST5 to enhance the AUE of the first power supply device 1, thereby enhancing an overall AUE of the power supply system, and reducing possibility of downtime of the system.

Embodiment Three

Figure 5:
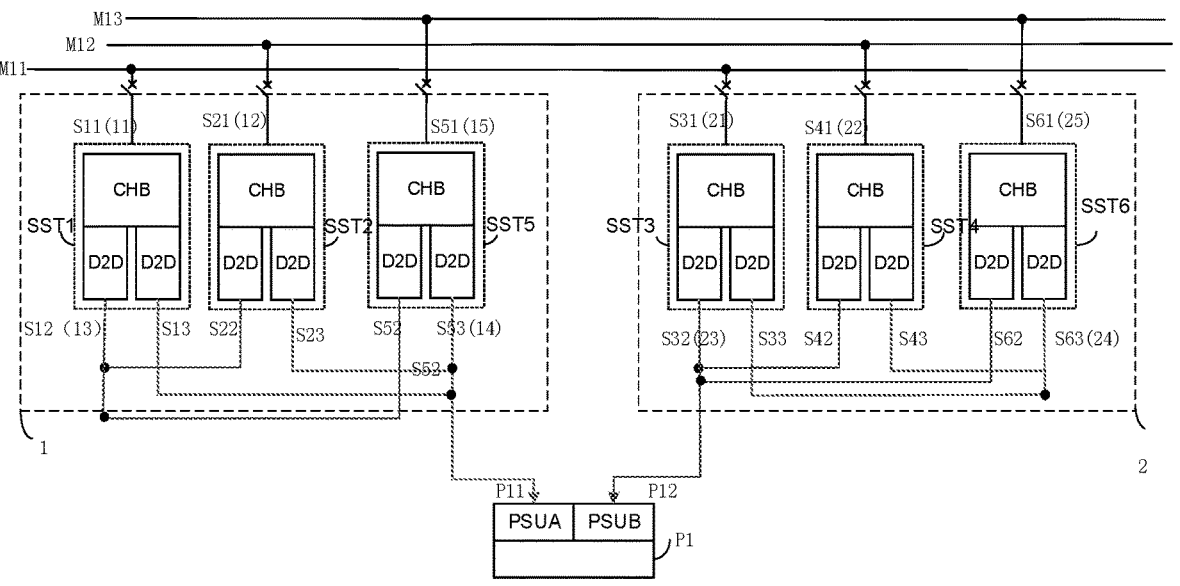
FIG. 5 is a topological schematic diagram of a power supply system.

Referring to FIG. 5, on the basis of embodiment two, the second power supply device 2 of this embodiment further includes a fifth port 25 and a sixth converter SST6.

A power supply bus electrically coupled to the fifth port 25 of the second power supply device 2 shall be different from the power supply buses electrically coupled to the first port 21 and the second port 22. For example, the fifth port 25 of the second power supply device 2 is electrically coupled to the third power supply bus M13, such that the first port 21, the second port 22 and the fifth port 25 of the second power supply device 2 are electrically coupled to three different power supply buses, respectively.

Specifically, the sixth converter SST6 includes a first port S61 electrically connected to the fifth port 25 of the second power supply device 2, a second port S62 electrically connected to the third port 23 of the second power supply device 2, and a third port S63 electrically connected to the fourth port 24 of the second power supply device 2.

As compared to the embodiment two, in this embodiment, the connection ways of the first converter SST1, the second converter SST2 and the fifth converter SST5 in the first power supply device 1 and the third converter SST3 and the fourth converter SST4 in the second power supply device 2 are unchanged, and the difference from embodiment two is that the second power supply device 2 in this embodiment newly adds the sixth converter SST6 to enhance the AUE of the second power supply device 2, thereby enhancing an overall AUE of the power supply system, and reducing possibility of downtime of the system.

Embodiment Four

In some embodiments, the power supply system further includes a second load, the second load is also electrically coupled between the first power supply device and the second power supply device as the first load. In this embodiment, the first power supply device 1 can include two or more converters, and the second power supply device 2 can also include two or more converters, the disclosure is not particularly limited thereto.

Figure 6:
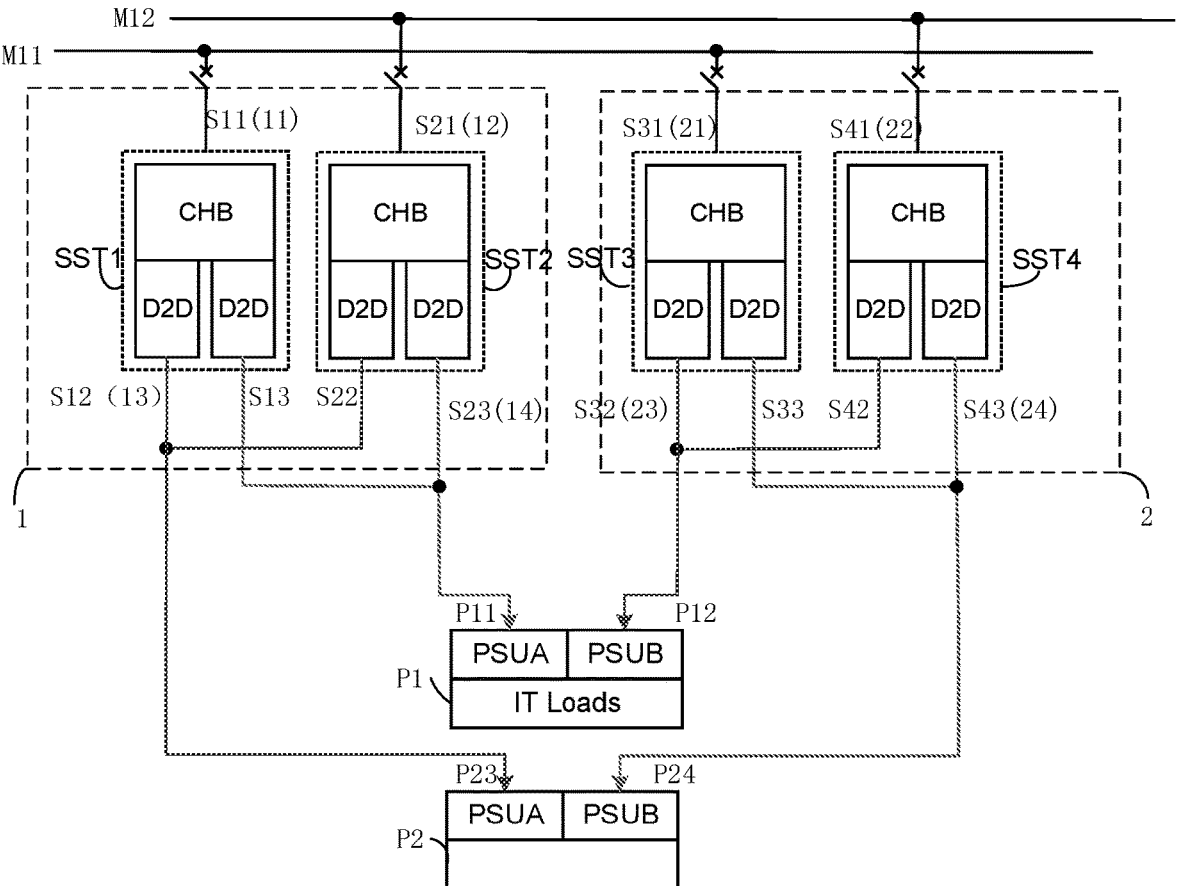
FIG. 6 is a topological schematic diagram of a power supply system.

Referring to FIG. 6, the first power supply device 1 and the second power supply device 2 in this embodiment include two converters, respectively, and a connection relation of the first power supply device 1 and the second power supply device 2 can refer to the embodiment one. On the basis of the embodiment one, this embodiment newly adds a second load P2.

In this embodiment, the first load P1 includes a first receiving port P11 electrically coupled to the fourth port 14 of the first power supply device 1, and a second receiving port P12 electrically coupled to the third port 23 of the second power supply device 2, the first receiving port P11 can receive power output from the fourth port 14 of the first power supply device 1, and the second receiving port P12 can receive power supply output from the third port 23 of the second power supply device 2. In order to satisfy operation requirement of the first load P1, the first receiving port P11 and the second receiving port P12 can receive power input simultaneously, and it is also possible that only one of them receives power input.

The second load P2 and the first load P1 have the same structure. The second load P2 includes two receiving ports, which are a third receiving port P23 electrically coupled to the third port 13 of the first power supply device 1, and a fourth receiving port P24 electrically coupled to the fourth port 24 of the second power supply device 2, the third receiving port P23 can receive power output from the third port 13 of the first power supply device 1, and the fourth receiving port P24 can receive power output from the fourth port 24 of the second power supply device 2. In order to satisfy operation requirement of the second load P2, the third receiving port P23 and the fourth receiving port P24 can receive power input simultaneously, and it is also possible that only one of them receives power input.

In the power supply system disclosed by this embodiment, a utilization efficiency of the entire power supply system can be effectively enhanced. Assuming that a required power of each loads is 600 kW, in the conventional 2N power supply system of the prior art, the two loads need four converters, each load corresponds to two converters, and a rated power desired by each converter is 600 kW, so an overall utilization efficiency of the converters is only 50%. However, in the power supply system provided in the disclosure, since the loads are bridged between the two power supply devices, and there are no redundant connection units between the two power supply devices, the four converters have a mutual backup relation by virtue of bridging of the loads, and in the case that the required powers of the two loads are 600 kW, a rated power of each converter can be reduced to 400 kW, so the overall utilization efficiency of the converters can be largely improved to 75%, thereby decreasing a capacity of the converters inputted as planned, and significantly reducing cost. The four converters in this embodiment can timely schedule power output of each converters according to the actual power requirement of the loads, and also ensure a high AUE of the system while enhancing the utilization efficiency.

Figure 7A:
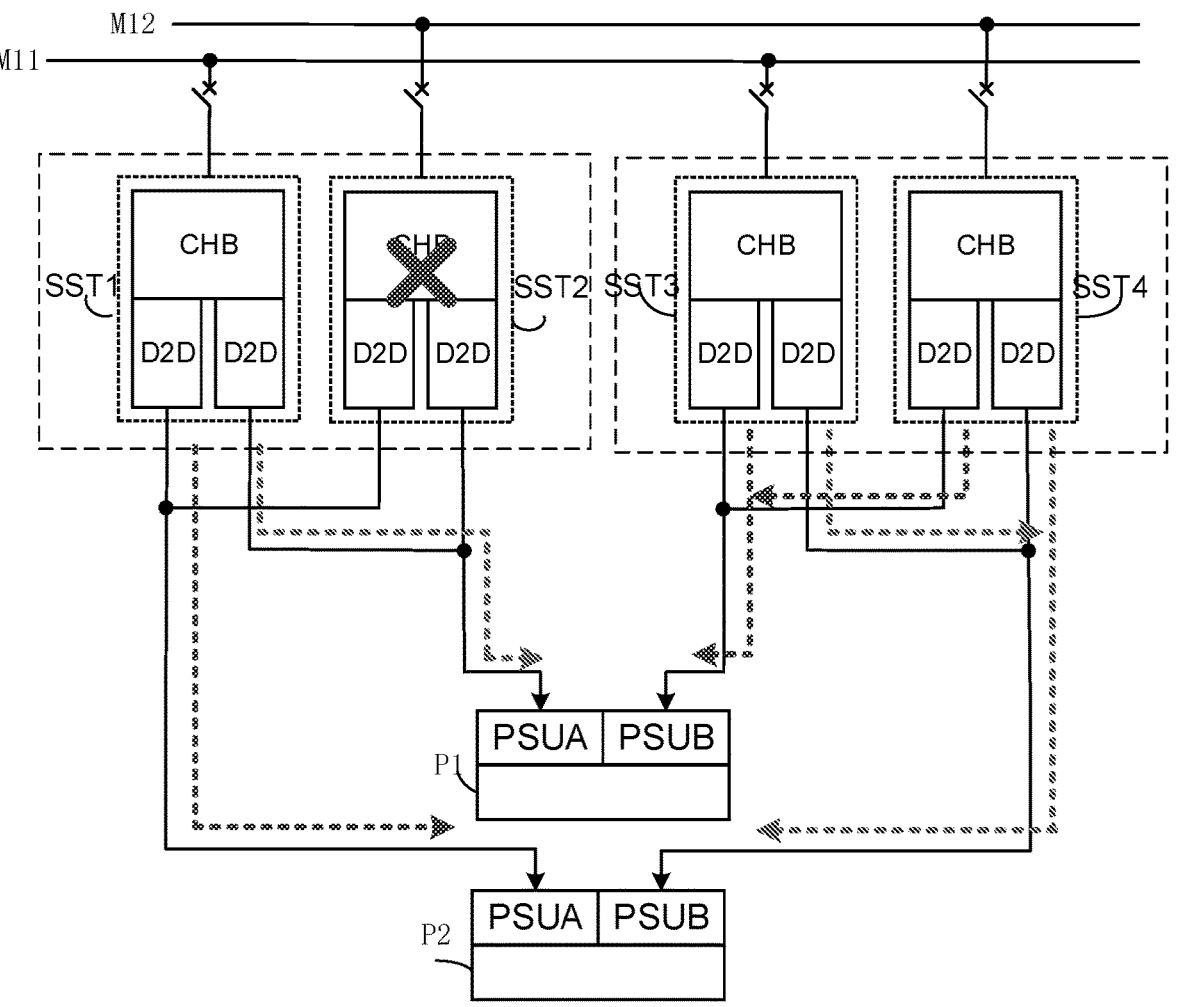
FIG. 7a is a diagram of working principle of the power supply system (working condition 1: one single converter has fault).

Moreover, this embodiment also can enhance the AUE of the power supply system, and ensure no downtime of the system. When any converter in the first power supply device or the second power supply device cannot output current, an output power of the first power supply device or the second power supply device can still be maintained. Referring to FIG. 7a, when the second port S22 and the third port S23 of the second converter SST2 of the first power supply device 1 cannot output current, such as the second converter SST2 has fault or the first power supply bus M12 electrically coupled to the second port 12 of the first power supply device 1 is disconnected, output powers at the third port 13 and the fourth port 14 of the first power supply device 1 can be maintained to be constant by adjusting an output power of the first converter SST1. At this time, the first load P1 and the second load P2 can still receive power from both sides through the first converter SST1 of the first power supply device 1 and the second power supply device 2.

Figure 7B:
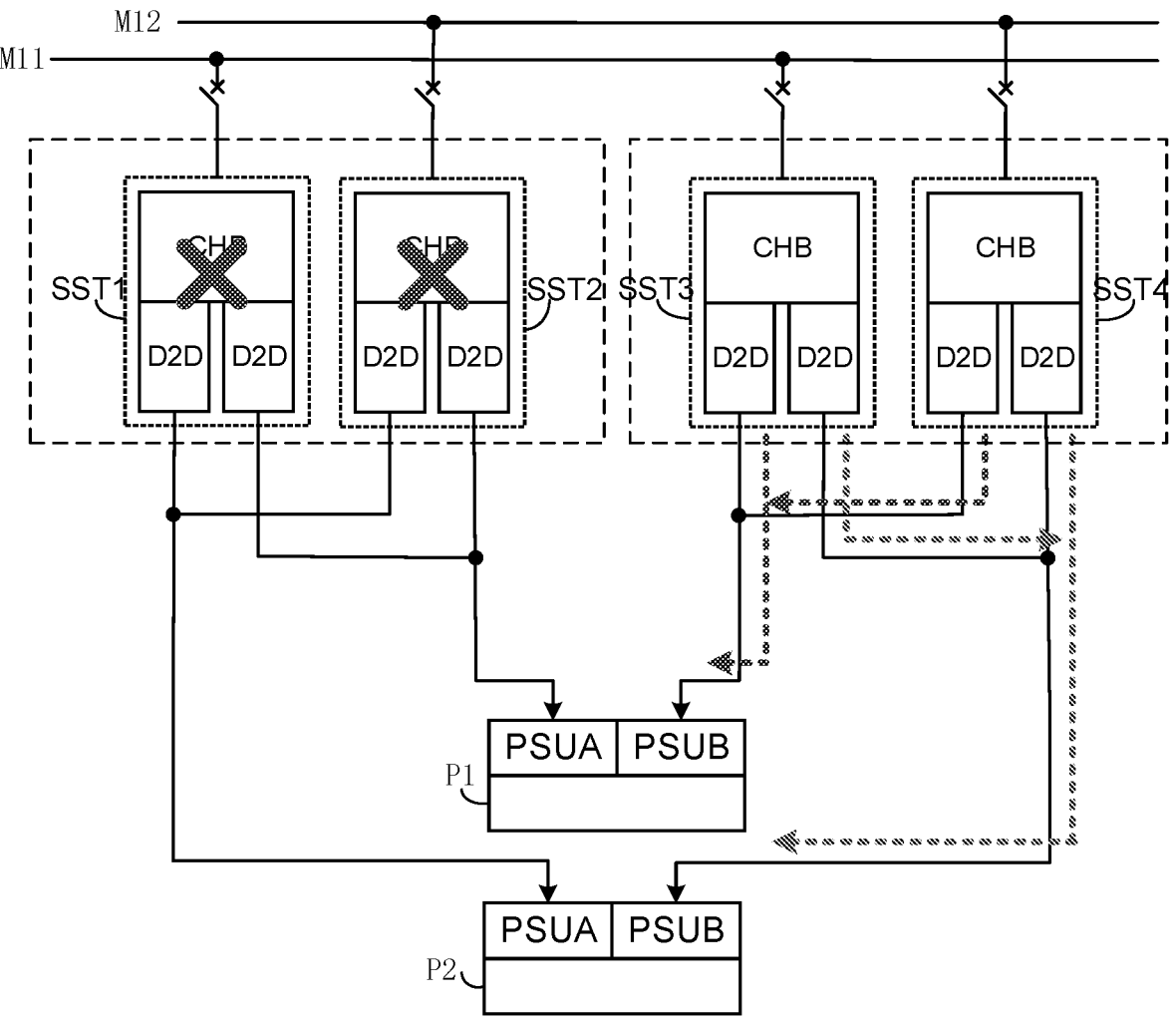
FIG. 7b is a diagram of working principle of the power supply system (working condition 2: the adjacent two converters of the same power supply device have fault).

When any of the first power supply device or the second power supply device cannot output current, power requirement of the first load and the second load can still be satisfied. Referring to FIG. 7b, when the third port 13 and the fourth port 14 of the first power supply device 1 cannot output current, for example, when the first converter SST1 and the second converter SST2 of the first power supply device 1 have fault or the power supply buses M11 and M12 correspondingly connected to the first port 11 and the second port 12 of the first power supply device 1 are disconnected, output powers of the third converter SST3 and the fourth converter SST4 in the second power supply device 2 are adjusted, such that powering of the second power supply device 2 can satisfy power requirement for normal operation of the first load P1 and the second load P2. Therefore, when any converter or any power supply device has fault, the power supply system provided in this embodiment can maintain normal operation of the two loads, and provide sufficient time for quick maintenance at the fault, thereby enhancing the AUE without downtime.

Embodiment Five

In some embodiments, in order to further enhance the AUE of the system, the power supply system further includes a third power supply device.

Figure 8:
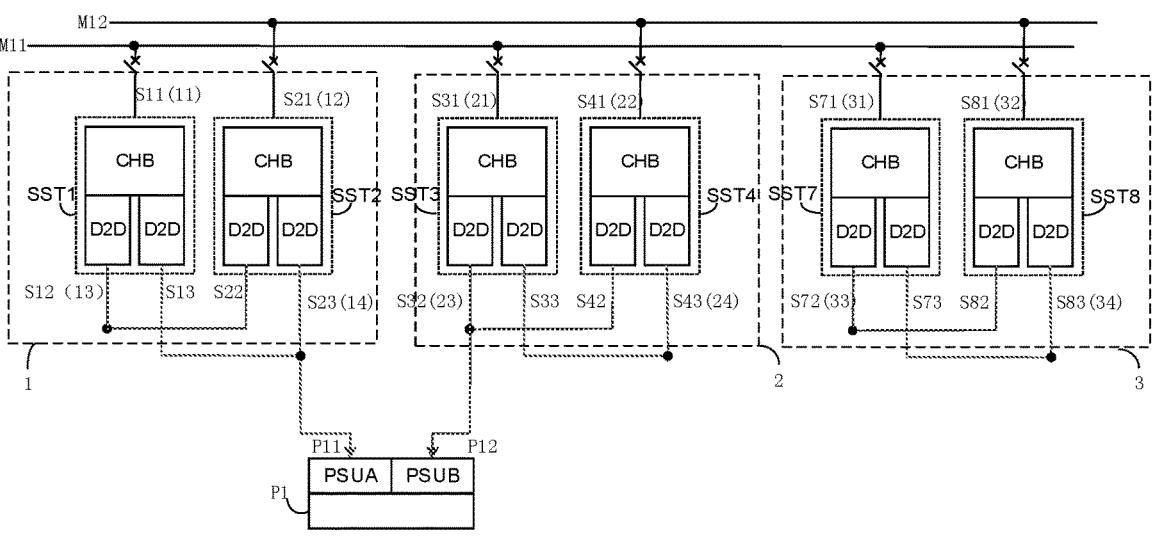
FIG. 8 is a topological schematic diagram of a power supply system.

Referring to FIG. 8, the third power supply device 3 has similar structure as the first power supply device 1 and the second power supply device 2, can include two or more converters. In this embodiment, the third power supply device 3 specifically includes two converters, which are a seventh converter SST7 and an eighth converter SST8, and includes a first port 31, a second port 32, a third port 33 and a fourth port 34. The first port 31 and the second port 32 of the third power supply device 3 are electrically coupled to different power supply buses, respectively. For example, the first port 31 of the third power supply device 3 is electrically coupled to the first power supply bus M11, and the second port 22 of the third power supply device 3 is electrically coupled to the second power supply bus M12.

The seventh converter SST7 includes a first port S71 electrically connected to the first port 31 of the third power supply device 3, a second port S72 electrically connected to the third port 33 of the third power supply device 3, and a third port S73 electrically connected to the fourth port 34 of the third power supply device 3.

The eighth converter SST8 includes a first port S81 electrically connected to the second port 32 of the third power supply device 3, a second port S82 electrically connected to the third port 33 of the third power supply device 3, and a third port S83 electrically connected to the fourth port 34 of the third power supply device 3.

In this embodiment, the first power supply device 1 can include two or more converters, and the second power supply device 2 can include two or more converters, the disclosure is not particularly limited thereto. FIG. 8 shows a power supply system structure where each of the first power supply device 1 and the second power supply device 2 includes two converters.

It should be noted that the number of power supply devices in the power supply system disclosed in the disclosure is not limited to three, the number of power supply devices can be expanded according to actual requirements. Meanwhile, the number of converters included in each power supply device is also not limited to two or three, it can be expanded according to actual requirements.

Embodiment Six

Figure 9:
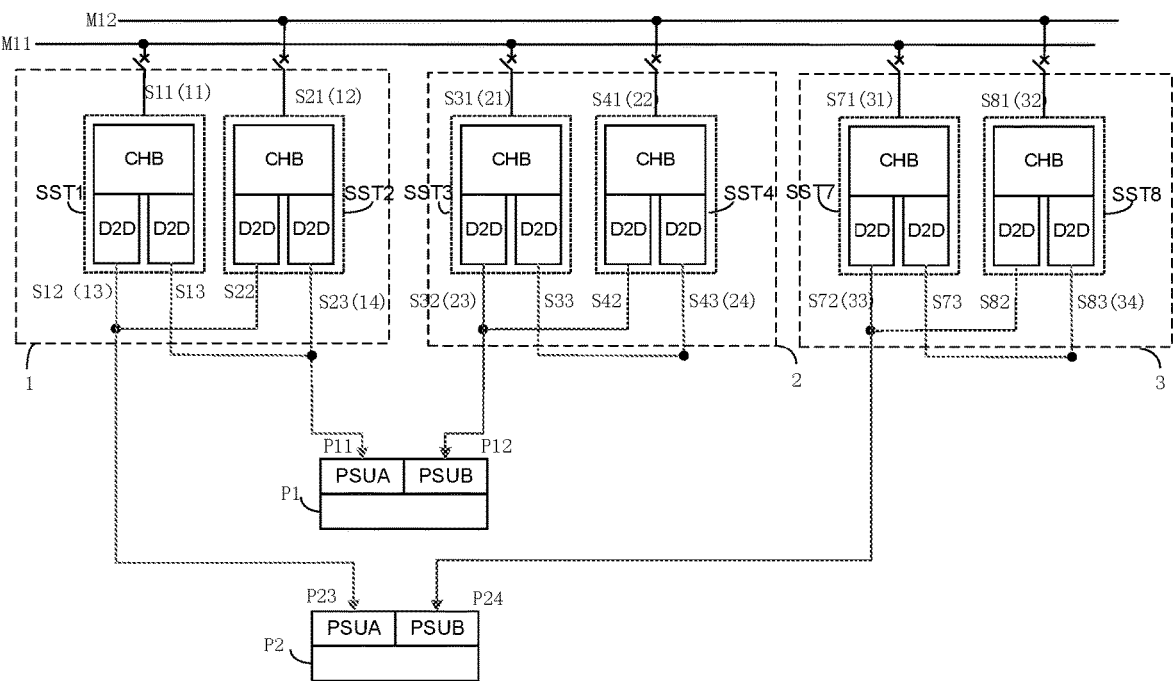
FIG. 9 is a topological schematic diagram of a power supply system.

On the basis of the embodiment five, this embodiment further expands the power supply system. Referring to FIG. 9, this embodiment further includes a second load P2.

The second load P2 can be coupled between the first power supply device 1 and the second power supply device 2, and can also be coupled between the second power supply device 2 and the third power supply device 3. Specific structure of the second load P2 is the same as that of the first load P1. The second load P2 includes a third receiving port P23 electrically coupled to the third port 13 of the first power supply device 1 or the fourth port 24 of the second power supply device 2, and a fourth receiving port P24 electrically coupled to the third port 33 of the third power supply device 3. Referring to FIG. 9, it shows a connection way, i.e., the third receiving port P23 of the second load P2 is electrically coupled to the third port 13 of the first power supply device 1, and the fourth receiving port P24 is electrically coupled to the third port 33 of the third power supply device 3.

In this embodiment, the first power supply device 1 can include two or more converters, the second power supply device 2 can include two or more converters, and the third power supply device 3 can include two or more converters, the disclosure is not particularly limited thereto.

Embodiment Seven

Figure 10:
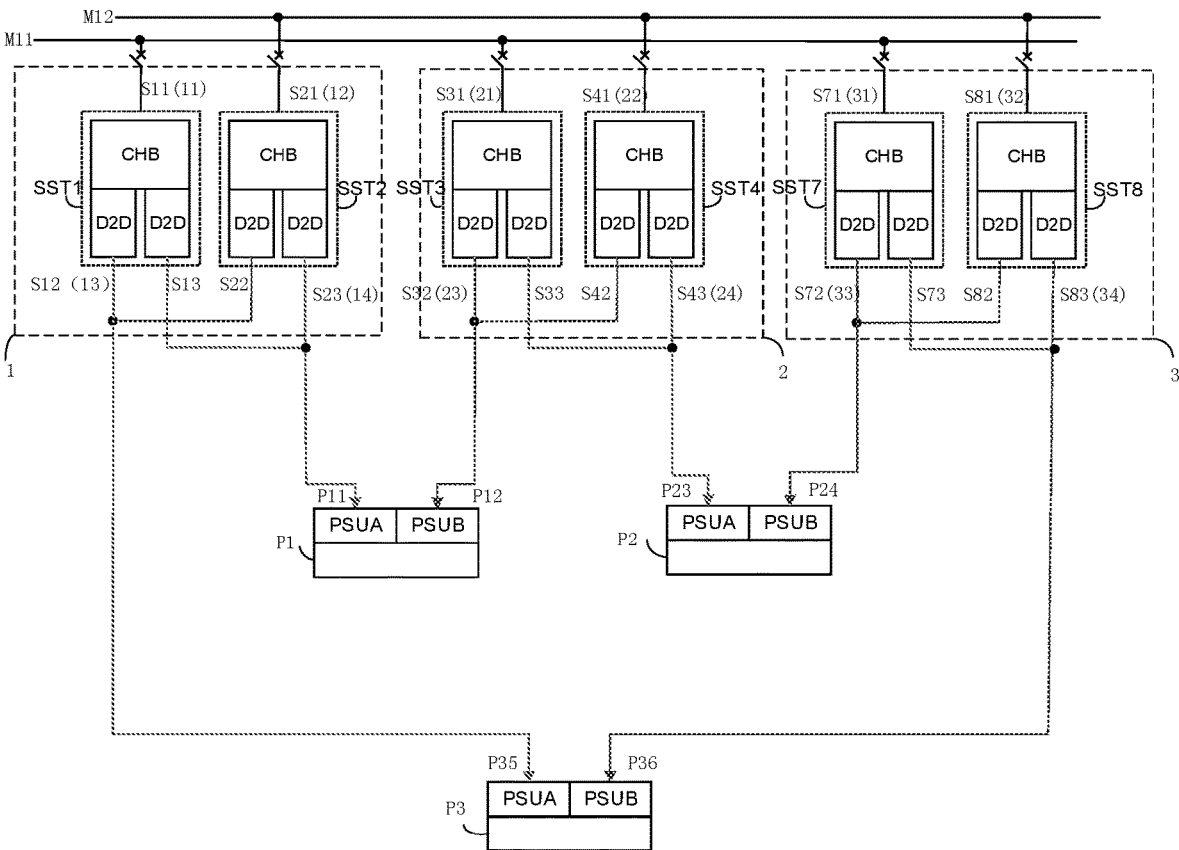
FIG. 10 is a topological schematic diagram of a power supply system.

On the basis of the embodiment six, this embodiment further expands the power supply system. Referring to FIG. 10, this embodiment further includes a third load P3.

The third load P3 can be coupled between the first power supply device 1 and the second power supply device 2, and can also be coupled between the second power supply device and the third power supply device. Specific structure of the third load P3 is the same as that of the first load P1 and the second load P2. The third load P3 includes a fifth receiving port P35 electrically coupled to the third port 13 of the first power supply device 1 or the fourth port 24 of the second power supply device 2, and a sixth receiving port P36 electrically coupled to the fourth port 34 of the third power supply device 3. It should be noted that the fifth receiving port P35 of the third load P3 and the third receiving port P23 of the second load P2 should be avoided to be electrically coupled to the same port of the same power supply device. Referring to FIG. 10, when the third receiving port P23 of the second load P2 is electrically coupled to the fourth port 24 of the second power supply device 2, the fifth receiving port P35 of the third load P3 should be preferably connected to the third port 13 of the first power supply device 1 to maximize efficiency of the power supply system.

In this embodiment, the first power supply device 1 can include two or more converters, the second power supply device 2 can include two or more converters, and the third power supply device 3 can include two or more converters, the disclosure is not particularly limited thereto.

It should be noted that the number of loads mounted to the power supply system disclosed by the disclosure is not limited to three, more loads can be mounted to the power supply system according to actual requirements. The number of power supply devices in the power supply system disclosed by the disclosure is not limited to three, it can be expanded according to actual requirements. Meanwhile, the number of converters included in each power supply device is also not limited to two or three, it can also be expanded according to actual requirements.

Embodiment Eight

The power supply system disclosed in the embodiment one includes the first power supply device 1, the second power supply device 2 and the first load P1, and on such basis, the power supply system disclosed in this embodiment further includes a first energy storage device E1 electrically coupled to the fourth port 14 of the first power supply device 1 or the third port 23 of the second power supply device 2. The first energy storage device E1 can be a storage battery configured to maintain normal operation of the first load P1 for a certain time, which is assumed to be 15 minutes.

Figure 11:
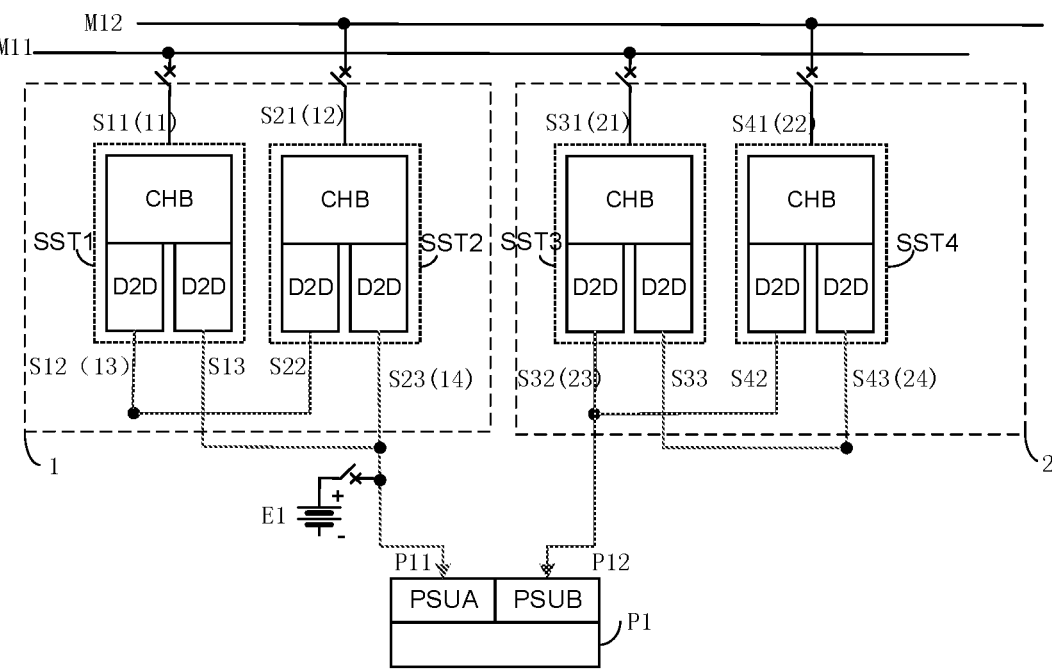
FIG. 11 is a topological schematic diagram of a power supply system.

The first energy storage device E1 newly added in this embodiment can further improve the AUE of the power supply system. When the first power supply device 1 and the second power supply device 2 cannot output current to the first load P1, for example, when the first power supply bus M11 and the second power supply bus M12 electrically coupled to the first power supply device 1 and the second power supply device 2 are disconnected, or all converters in the first power supply device 1 and the second power supply device 2 have fault, referring to FIG. 11, the first energy storage device E1 can directly power the first load P1 through the first receiving port P11 to maintain operation of the first load P1. Addition of the first energy storage device E1 can provide sufficient time for maintenance of the fault in the case of an extreme fault, and in particular, when the load is a data processing device, it can also provide sufficient time to save data, thereby preventing loss of data, and largely enhancing the AUE of the power supply system.

In this embodiment, the first power supply device 1 can include two or more converters, and the second power supply device 2 can include two or more converters, but the disclosure is not particularly limited thereto.

Embodiment Nine

Figure 12:
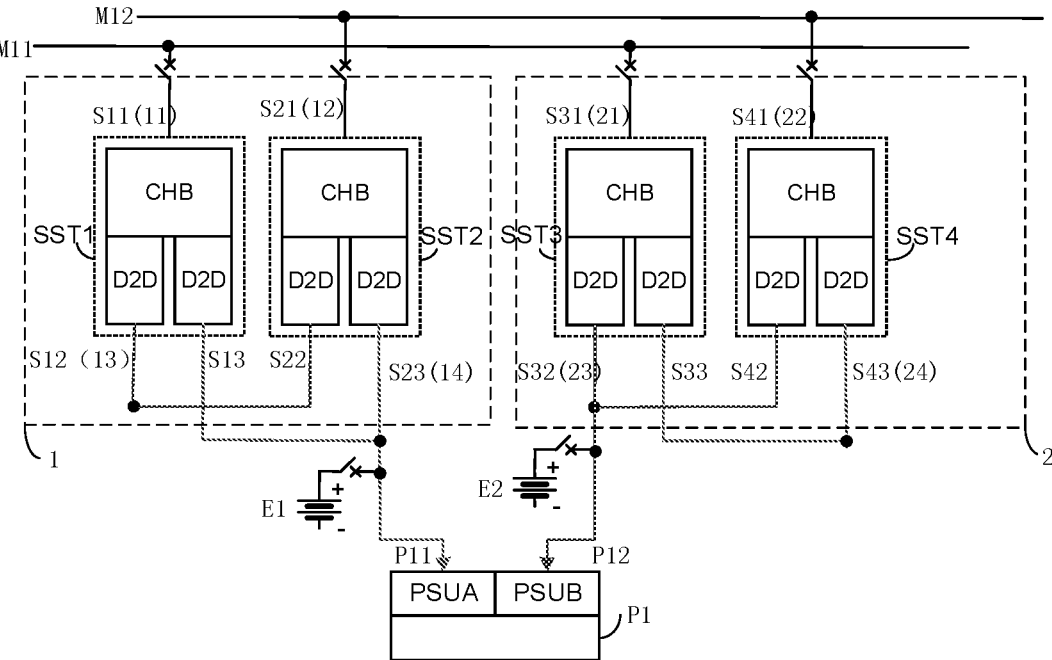
FIG. 12 is a topological schematic diagram of a power supply system.

On the basis of the embodiment eight, this embodiment further expands the power supply system, and newly adds a second energy storage device. Referring to FIG. 12, besides the first power supply device 1, the second power supply device 2 and the first load P1, the power supply system disclosed in this embodiment further includes a first energy storage device E1 and a second energy storage device E2. The first energy storage device E1 and the second energy storage device E2 can be storage batteries configured to maintain normal operation of the first load P1 for a certain time, which is assumed to be 15 minutes.

Referring to FIG. 12, the first energy storage device E1 is electrically coupled to the fourth port 14 of the first power supply device 1, and the second energy storage device E2 is electrically coupled to the third port 23 of the second power supply device 2.

As compared to the embodiment eight, the second energy storage device E2 newly added in this embodiment further improves the AUE of the power supply system. When the first power supply device 1 and the second power supply device 2 cannot output current to the first load P1, for example, when the first power supply bus M11 and the second power supply bus M12 are disconnected, or all converters in the first power supply device 1 and the second power supply device 2 have fault, referring to FIG. 12, the first energy storage device E1 can directly power the first load P1 through the first receiving port P11 to maintain operation of the first load P1, and the second energy storage device E2 also can directly power the first load P1 through the second receiving port P12 to maintain operation of the first load P1. Since the power supply system disclosed in this embodiment includes two energy storage devices, when one energy storage device has fault, or a line between the energy storage device and the load has fault, the other energy storage device can maintain normal operation of the load. For example, in this embodiment, when the line between the first energy storage device E1 and the first receiving port P11 has fault, the second energy storage device E2 still can power the first load P1 through the second receiving port P12.

In this embodiment, the first energy storage device E1 and the second energy storage device E2 can provide sufficient time for maintenance of the fault in the case of an extreme fault in the power supply system, and in particular, when the load is a data processing device, it also can provide sufficient time to save data, thereby preventing loss of data, and largely enhancing the AUE of the power supply system.

In this embodiment, the first power supply device 1 can include two or more converters, and the second power supply device 2 can include two or more converters, the disclosure is not particularly limited thereto.

Embodiment Ten

Figure 13:
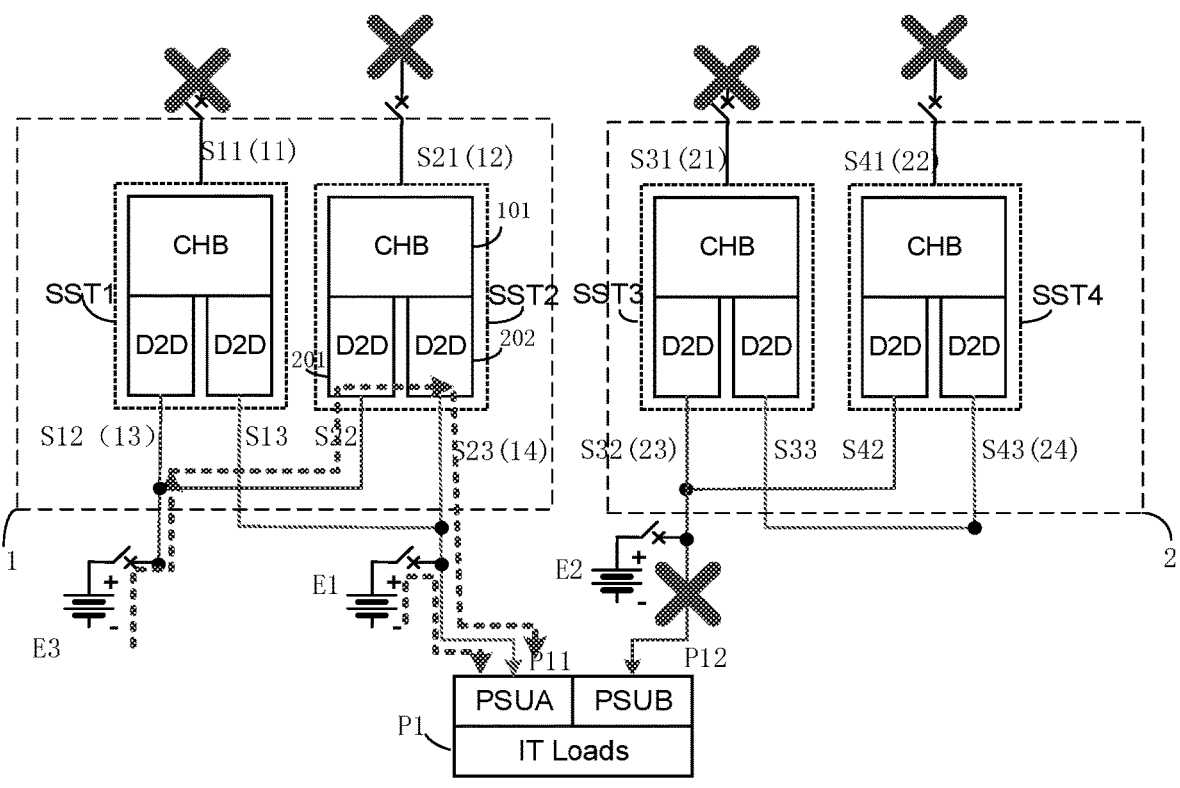
FIG. 13 is a topological schematic diagram of a power supply system.

On the basis of the embodiment nine, this embodiment further expands the power supply system, and newly adds a third energy storage device. Referring to FIG. 13, besides the first power supply device 1, the second power supply device 2, the first load P1, the first energy storage device E1 and the second energy storage device E2, the power supply system disclosed in this embodiment further includes a third energy storage device E3.

Referring to FIG. 13, the third energy storage device E3 is electrically coupled to the third port 13 of the first power supply device 1. In this embodiment, the first energy storage device E1, the second energy storage device E2 and the third energy storage device E3 can be used as backup power supplies of the first load. Working ways of the first energy storage device E1 and the second energy storage device E2 are the same as that in the embodiment nine, the details are not described here. Hereinafter working way of the third energy storage device E3 is introduced.

In the power supply method, when the first power supply device 1 and the second power supply device 2 cannot output current to the first load P1, and a line between the second energy storage device E2 and the second receiving port P12 has fault, the third energy storage device E3 can directly power the first load P1. Energy of the third energy storage device E3 can be inputted to the first power supply device 1 along the third port 13 of the first power supply device 1, and outputted to the first receiving port of the first load P1 along the fourth port 14 of the first power supply device. Referring to FIG. 13, bidirectional flow of energy can be achieved between the second port 22 and the third port 23 of the second converter SST2, thereby ensuring that the first load P1 can receive power of the first energy storage device E1 and the third energy storage device E3.

In order to achieve bidirectional flow of energy between the second port 22 and the third port 23 of the second converter SST2, the second converter SST2 should have corresponding support in structure.

Figure 2:
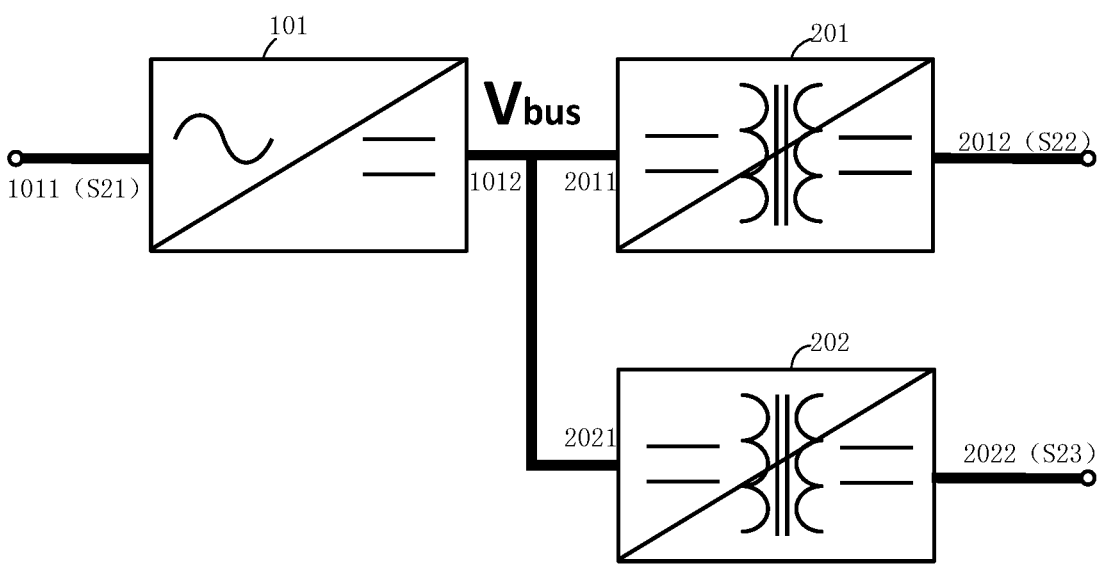
FIG. 2 is a topological schematic diagram of converters of the power supply system.

Referring to FIG. 2, the second converter SST2 includes a rectifier circuit 101, a first isolated transformer circuit 201 and a second isolated transformer circuit 202. The rectifier circuit 101 includes a first side 1011, which is the first port S21 of the second converter SST2, and a second side 1012 connected to a common bus Vbus. A first side 2011 of the first isolated transformer circuit 201 and a first side 2021 of the second isolated transformer circuit 202 are connected in parallel to the common bus Vbus. A second side 2012 of the first isolated transformer circuit 201 is the second port S22 of the second converter SST2, and a second side 2022 of the second isolated transformer circuit 202 is the third port S23 of the second converter SST2. It should be noted that all converters in all embodiments disclosed in the disclosure can use the same structure of the second converter SST2.

When the power supply system does not have any operation fault, an alternating current of the second bus M12 is inputted along the first side 1011 of the rectifier circuit 101 (i.e., the first port S21 of the second converter SST2), and after rectification of the rectifier circuit 101, is converted to a direct current to be outputted to the common bus Vbus along the second side 1012 of the rectifier circuit 101, then flow into the first isolated transformer circuit 201 and the second isolated transformer circuit 202 through the first side 2011 of the first isolated transformer circuit 201 and the first side 2021 of the second isolated transformer circuit 202, and after transformer processing, be outputted along the second side 2021 of the first isolated transformer circuit 201 (i.e., the second port S22 of the second converter SST2) and the second side 2022 of the second isolated transformer circuit 202 (i.e., the third port S23 of the second converter SST2).

When the power supply system has operation fault, in order to achieve bidirectional flow of energy between the second port S22 and the third port S23 of the second converter SST2, the first isolated transformer circuit 201 and the second isolated transformer circuit 202 should be configured to be bidirectional DC/DC conversion circuits. Combining with FIG. 13, energy of the third energy storage device E3 can be inputted to the first isolated transformer circuit 201 along the second side 2012 of the first isolated transformer circuit 201, and after conversion of the bidirectional DC/DC conversion circuits, energy flows to the common bus Vbus along the first side 2011 of the first isolated transformer circuit 201, then is inputted to the second isolated transformer circuit 202 along the first side 2021 of the second isolated transformer circuit 202, and outputted to the first load P1 along the second side 2022, such that bidirectional flow of energy between the second port S22 and the third port S23 of the second converter SST2 can be achieved.

It should be noted that all converters in all embodiments disclosed in the disclosure can use the same structure of the second converter SST2.

Since the third energy storage device E3 can also act as a backup power supply of the first load P1, i.e., the first receiving port P12 of the first load P1 can receive energy of the first energy storage device E1 and the third energy storage device E3, an energy storage capacity of the first energy storage device E1 and the third energy storage device E3 can be set to be 50% to 60% of a capacity for normal operation of the first load P1 for a certain time, which is assumed to be 15 minutes.

Embodiment Eleven

Figure 14A:
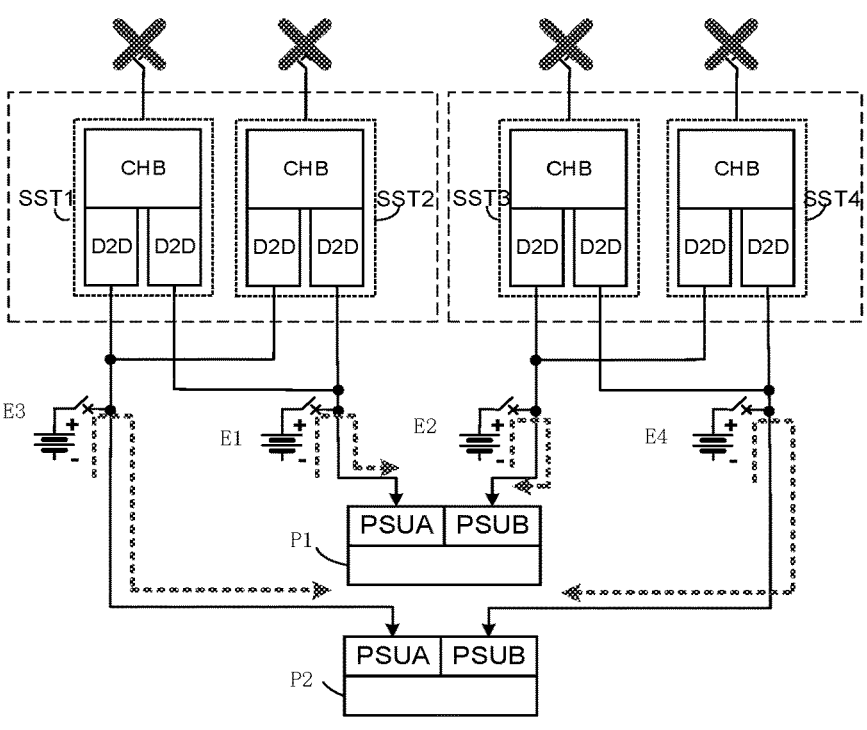
FIG. 14a is a diagram of working principle of the power supply system (working condition 1: the power supply bus is disconnected).

On the basis of the embodiment ten, this embodiment makes further expansion, and further includes a second load and a fourth energy storage device. Referring to FIG. 14a, the second load P2 includes a third receiving port P23 electrically coupled to the third port 13 of the first power supply device 1, and a fourth receiving port P24 electrically coupled to the fourth port 24 of the second power supply device 2, and the fourth energy storage device E4 is electrically coupled to the fourth port 24 of the second power supply device.

In the power supply system disclosed in this embodiment, bidirectional flow of energy can be achieved between the second ports and the third ports of all converters.

In the power supply method, when lines between all energy storage devices and the receiving ports of the correspondingly connected loads have no faults, each load can receive power from the two corresponding energy storage devices connected directly. Referring to FIG. 14a, for example, when all power supply buses are disconnected, the first load P1 can receive power from the first energy storage device E1 and the second energy storage device E2.

Figure 14B:
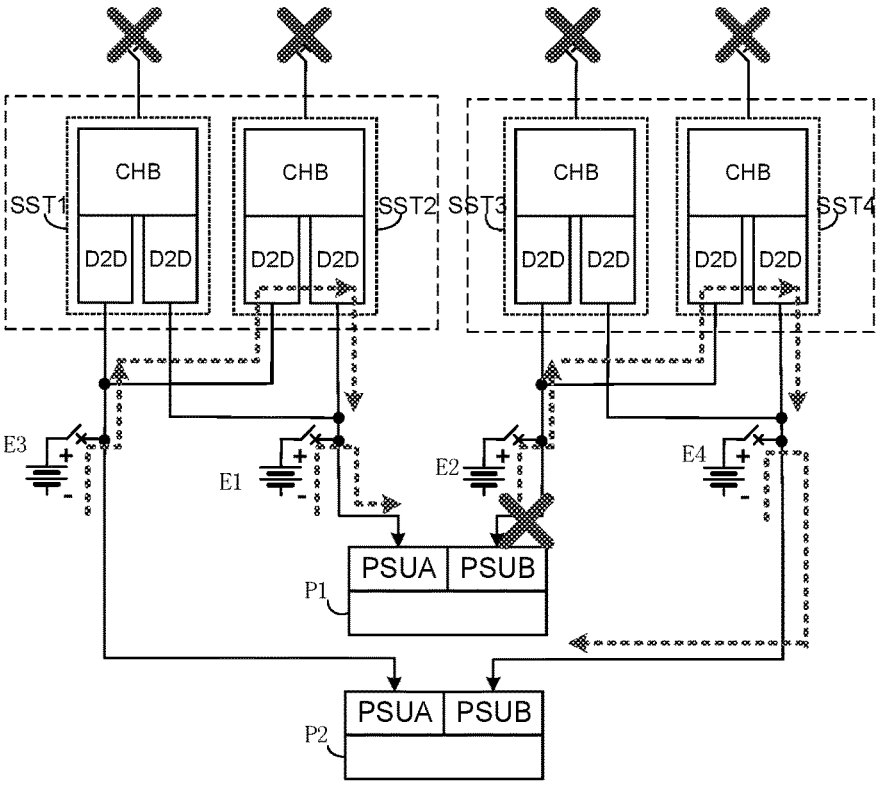
FIG. 14b is a diagram of working principle of the power supply system (working condition 2: the power supply bus is disconnected and a line between at least one energy storage device and a load has fault).

When the line between one energy storage device and the receiving port of the correspondingly connected load has fault, each load can be ensured to receive power of the two energy storage devices Referring to FIG. 14b, when the line between the second energy storage device E2 and the second receiving port P12 has fault, as described in the embodiment nine, energy of the third energy storage device E3 can flow to the fourth port 14 along the third port 13 of the first power supply device 1, such that the first load P1 can receive power from the first energy storage device E1 and the third energy storage device E3. Based on the same function, energy of the second energy storage device E2 can flow to the fourth port 24 along the third port 23 of the second power supply device 2, such that the second load P2 can receive power from the second energy storage device E2 and the fourth energy storage device E4.

Since the loads can receive power of the two energy storage devices in extreme cases, the capacity of each energy storage device can be adjusted to 50% to 60% of a capacity for normal operation of the loads for a certain time, which is assumed to be 15 minutes.

Therefore, in the power supply system disclosed in this embodiment, configuration of the energy storage devices can be reduced to a 60%+60% configuration mode from the conventional 100%+100% configuration mode, thereby facilitating reducing configuration cost of the battery.

When the power supply system is configured with energy storage devices, for example, in the embodiments eight, nine, ten and eleven, after energy of the energy storage devices is inputted to the correspondingly connected converters, it also can be outputted to the buses correspondingly connected to the converters. Referring to FIG. 13, for example, energy of the third energy storage device E3 can be inputted to the first converter SST1 along the second port S12 of the first converter SST1, and then outputted to the first bus M11 along the first port S11 of the first converter SST1, or energy of the third energy storage device E3 can be inputted to the second converter SST2 along the second port S22 of the second converter SST2, and then outputted to the second bus M12 along the first port S21 of the second converter SST2.

It should be noted that terms "include" or any other variants intend to cover non-exclusive inclusion, such that the procedure, method, object or device including a series of elements include those elements, and also include other elements that are not clearly listed, or further include inherent elements of the procedure, method, object or device. In the case of no more limits, an element defined by the sentence "including one . . ." does not exclude additional same element in the procedure, method, object or device including the element. Moreover, it shall be pointed out that the scope of the method and device in the embodiments of the disclosure is not limited to execute functions according to the illustrated or discussed order, and also can include executing functions in a substantially simultaneous manner or an opposite order based on the involved functions. For example, the described method can be executed according to the order different from that described, and various steps also can be applied, omitted or combined. In addition, the features described in some examples can be combined in other examples.

The embodiments of the disclosure are described with reference to the accompanying drawings above, but the disclosure is not limited thereto. The detailed embodiments are only illustrative, not limiting, and under inspiration of the disclosure, those ordinary in the art also can make many forms without departing from aims of the disclosure and scope of the claims, which all belong to protection of the disclosure.

What is claimed is:

1. A power supply system, comprising:
   a first power supply device comprising a first port, a second port, a third port and a fourth port, the first port of the first power supply device and the second port of the first power supply device electrically coupled to different power supply buses; the first power supply device further comprising:
   a first converter comprising a first port electrically connected to the first port of the first power supply device, a second port electrically connected to the third port of the first power supply device, and a third port electrically connected to the fourth port of the first power supply device; and
   a second converter comprising a first port electrically connected to the second port of the first power supply device, a second port electrically connected to the third port of the first power supply device, and a third port electrically connected to the fourth port of the first power supply device;
   a second power supply device comprising a first port, a second port, a third port and a fourth port, the first port of the second power supply device and the second port of the second power supply device electrically coupled to different power supply buses; the second power supply device further comprising:
   a third converter comprising a first port electrically connected to the first port of the second power supply device, a second port electrically connected to the third port of the second power supply device, and a third port electrically connected to the fourth port of the second power supply device; and a fourth converter comprising a first port electrically connected to the second port of the second power supply device, a second port electrically connected to the third port of the second power supply device, and a third port electrically connected to the fourth port of the second power supply device; and a first load comprising a first receiving port electrically coupled to the fourth port of the first power supply device, and a second receiving port electrically coupled to the third port of the second power supply device.

2. The power supply system according to claim 1, wherein the first power supply device further comprising a fifth port and a fifth converter; the first port of the first power supply device, the second port of the first power supply device and the fifth port of the first power supply device are each electrically coupled to different power supply buses;

the fifth converter comprising a first port electrically connected to the fifth port of the first power supply device, a second port electrically connected to the third port of the first power supply device, and a third port electrically connected to the fourth port of the first power supply device.

3. The power supply system according to claim 2, wherein the second power supply device further comprising a fifth port and a sixth converter; the first port of the second power supply device, the second port of the second power supply device and the fifth port of the second power supply device are each electrically coupled to different power supply buses;

the sixth converter comprising a first port electrically connected to the fifth port of the second power supply device, a second port electrically connected to the third port of the second power supply device, and a third port electrically connected to the fourth port of the second power supply device.

4. The power supply system according to claim 1, further comprising:

a second load comprising a third receiving port electrically coupled to the third port of the first power supply device, and a fourth receiving port electrically coupled to the fourth port of the second power supply device.

5. The power supply system according to claim 1, further comprising:

a third power supply device comprising a first port, a second port, a third port and a fourth port, the first port of the third power supply device and the second port of the third power supply device are electrically coupled to different power supply buses; the third power supply device further comprising:

a seventh converter comprising a first port electrically connected to the first port of the third power supply device, a second port electrically connected to the third port of the third power supply device, and a third port electrically connected to the fourth port of the third power supply device; and an eighth converter comprising a first port electrically connected to the second port of the third power supply device, a second port electrically connected to the third port of the third power supply device, and a third port electrically connected to the fourth port of the third power supply device.

6. The power supply system according to claim 5, further comprising:

a second load comprising a third receiving port electrically coupled to the third port of the first power supply device or the fourth port of the second power supply device, and a fourth receiving port electrically coupled to the third port of the third power supply device.

7. The power supply system according to claim 6, further comprising:

a third load comprising a fifth receiving port electrically coupled to the third port of the first power supply device or the fourth port of the second power supply device, and a sixth receiving port electrically coupled to the fourth port of the third power supply device.

8. The power supply system according to claim 1, further comprising a first energy storage device electrically coupled to the fourth port of the first power supply device or the third port of the second power supply device.

9. The power supply system according to claim 1, further comprising a first energy storage device electrically coupled to the fourth port of the first power supply device, and a second energy storage device electrically coupled to the third port of the second power supply device.

10. The power supply system according to claim 9, further comprising a third energy storage device electrically coupled to the third port of the first power supply device, and a fourth energy storage device electrically coupled to the fourth port of the second power supply device.

11. The power supply system according to claim 1, wherein each of the converters comprising a rectifier circuit, a first isolated transformer circuit, and a second isolated transformer circuit; a first side of the rectifier circuit corresponds to the first port of the converter, a first side of the first isolated transformer circuit and a first side of the second isolated transformer circuit are connected in parallel to a second side of the rectifier circuit, a second side of the first isolated transformer circuit corresponds to the second port of the converter, and a second side of the second isolated transformer circuit corresponds to the third port of the converter.

12. The power supply system according to claim 11, wherein, each of the isolated transformer circuits are bidirectional DC/DC conversion circuits.

13. A power supply method using the power supply system of claim 1, wherein, when the third port of the second converter cannot output current, an output power of the first converter is adjusted to maintain an output power of the fourth port of the first power supply device.

14. The power supply method according to claim 13, wherein, when the third port and the fourth port of the first power supply device cannot output current, an output power of the second power supply device is adjusted to maintain powering of the first load.

15. The power supply method according to claim 13, wherein, the power supply system further comprising a first energy storage device electrically coupled to the fourth port of the first power supply device or the third port of the second power supply device;

when the fourth port of the first power supply device and the third port of the second power supply device cannot output current, the first energy storage device powers the first load.

16. The power supply system according to claim 13, wherein, the power supply system further comprising a first energy storage device electrically coupled to the fourth port of the first power supply device, and a second energy storage device electrically coupled to the third port of the second power supply device;

when the fourth port of the first power supply device and the third port of the second power supply device cannot output current, the first energy storage device and the second energy storage device power the first load simultaneously.

17. The power supply system according to claim 16, wherein, the power supply system further comprising a third energy storage device electrically coupled to the third port of the first power supply device;

when the second energy storage device cannot power the first load, energy of the third energy storage device is inputted to the first power supply device along the third port of the first power supply device, and outputted to the first load along the fourth port of the first power supply device.

18. A power supply method using the power supply system of claim 1, wherein, the power supply system further comprising a first energy storage device electrically coupled to the fourth port of the first power supply device;

the energy of the first energy storage device is inputted to the first power supply device along the fourth port of the first power supply device, and outputted along the first port or the second port of the first power supply device.

* * * * *